(12) United States Patent
Cianciotto (10) Patent No.: US 7,414,793 B2
(45) Date of Patent: Aug. 19, 2008

(54) WHITE LIGHT SPLITTING AND HOMOGENIZING SYSTEMS AND METHODS

(75) Inventor: Frank T. Cianciotto, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 11/490,607

(22) Filed: Jul. 21, 2006

(65) Prior Publication Data

US 2008/0123196 A1 May 29, 2008

(51) Int. Cl.
*G02B 27/14* (2006.01)
*G02B 27/10* (2006.01)

(52) U.S. Cl. ........................ 359/634; 359/618
(58) Field of Classification Search .................. 359/618, 359/627, 629, 634, 726; 362/558, 551, 552, 362/583; 385/133, 146
See application file for complete search history.

(56) References Cited

U.S. PATENT DOCUMENTS

| | | |
|---|---|---|
| 3,825,741 A | 7/1974 | Morton et al. |
| 4,632,513 A | 12/1986 | Stowe et al. |
| 4,964,692 A | 10/1990 | Prescott |
| 5,054,869 A | 10/1991 | Doyle |
| 5,054,874 A | 10/1991 | Hill |
| 5,375,185 A | 12/1994 | Hermsen |
| 5,553,183 A | 9/1996 | Bechamps |
| 5,604,837 A | 2/1997 | Tanaka |
| 5,701,191 A | 12/1997 | Iwasaki |
| 5,727,108 A | 3/1998 | Hed |
| 5,803,575 A | 9/1998 | Ansems et al. |

(Continued)

FOREIGN PATENT DOCUMENTS

JP 11-017969 1/1999

(Continued)

OTHER PUBLICATIONS

U.S. Appl. No. 10/744,922, dated Dec. 23, 2003, Cianciotto et al.

(Continued)

*Primary Examiner*—Ricky Mack
*Assistant Examiner*—Mahidere S Sahle
(74) *Attorney, Agent, or Firm*—MacPherson Kwok Chen & Heid LLP; Greg J. Michelson (57) ABSTRACT

In accordance with an embodiment of the present invention, an apparatus includes a hollow tubular body with a polygonal cross-section and a highly reflective interior surface, a first filter, and a second filter. The body includes an input end portion configured to receive and reflect white light having a Gaussian profile to produce a homogenized input beam, a first output leg portion configured to receive and reflect a first reflected beam to produce a first homogenized output beam having a first wavelength characteristic and a top hat profile, and a second output leg portion configured to receive and reflect a second reflected beam to produce a second homogenized output beam having a second wavelength characteristic and a top hat profile. The first filter is configured to receive the homogenized input beam and produce the first reflected beam and a first transmitted beam. The second filter is configured to receive the first transmitted beam and produce the second reflected beam.

24 Claims, 4 Drawing Sheets

U.S. PATENT DOCUMENTS

| | | | |
|---|---|---|---|
| 5,828,505 A | 10/1998 | Farmiga | |
| 6,038,361 A | 3/2000 | Yoshikawa et al. | |
| 6,104,857 A | 8/2000 | Ishiharada et al. | |
| 6,125,228 A * | 9/2000 | Gong | 385/146 |
| 6,149,289 A | 11/2000 | Kuramitsu et al. | |
| 6,324,330 B1 | 11/2001 | Stites | |
| 6,332,688 B1 | 12/2001 | Magarill | |
| 6,366,308 B1 | 4/2002 | Hawryluk et al. | |
| 6,513,937 B1 | 2/2003 | Dehmlow | |
| 6,771,870 B2 | 8/2004 | Strobl et al. | |
| 6,792,190 B2 | 9/2004 | Xin et al. | |
| 6,801,701 B1 | 10/2004 | Montgomery et al. | |
| 6,857,764 B2 | 2/2005 | Kohno | |
| 6,986,591 B2 | 1/2006 | Pate | |
| 7,113,684 B1 * | 9/2006 | Cianciotto et al. | 385/133 |
| 7,171,097 B2 * | 1/2007 | Cianciotto et al. | 385/133 |
| 7,182,495 B2 | 2/2007 | Cianciotto et al. | |
| 7,265,906 B2 | 9/2007 | Cianciotto | |
| 2001/0005222 A1 | 6/2001 | Yamaguchi | |
| 2004/0137089 A1 | 7/2004 | Dinan | |
| 2004/0137189 A1 | 7/2004 | Tellini et al. | |
| 2005/0084210 A1 | 4/2005 | Cha | |
| 2005/0112639 A1 | 5/2005 | Wang et al. | |
| 2005/0135766 A1 * | 6/2005 | Cianciotto et al. | 385/133 |
| 2005/0162853 A1 | 7/2005 | Jain | |
| 2005/0237621 A1 | 10/2005 | Peterson | |
| 2005/0270652 A1 | 12/2005 | Voss et al. | |
| 2006/0256445 A1 * | 11/2006 | Zueger | 359/634 |
| 2006/0256449 A1 * | 11/2006 | Cianciotto et al. | 359/726 |
| 2007/0081255 A1 * | 4/2007 | Cianciotto et al. | 359/627 |

FOREIGN PATENT DOCUMENTS

JP 11-250227 9/1999

OTHER PUBLICATIONS

U.S. Appl. No. 10/857,073, dated May 28, 2004, Cianciotto et al.
U.S. Appl. No. 11/830,706, dated Jul. 30, 2007, Cianciotto.
U.S. Appl. No. 11/670,320, dated Feb. 01, 2007, Cianciotto.

* cited by examiner

WHITE LIGHT SPLITTING AND HOMOGENIZING SYSTEMS AND METHODS

TECHNICAL FIELD

The present invention relates generally to optical guides, and more particularly to an optical apparatus and method to split and redirect an incoming white light Gaussian profile beam into a plurality of different colored homogenized top hat profile output beams.

BACKGROUND

Optical devices that split or homogenize an incoming light beam are known, yet such devices typically include heavy, expensive, and delicate components that may limit the application of these useful techniques. Previous attempts have included the use of a hex-shaped glass rod with an exterior cladding configured to provide reflection of light within the glass rod. Such a glass rod is typically very expensive to produce, extremely fragile, and light may leak out of the glass rod if the exterior cladding is damaged. Further, because the incoming light beam typically has a Gaussian, non-uniform intensity distribution, additional components are typically required to produce a uniform intensity distribution. Such additional components contribute to the increased cost, weight, and complexity of the optical system. Thus, there remains a need for an apparatus and method to provide a combined white light splitter and homogenizer in a rugged, compact, and low cost manner.

SUMMARY

Apparatuses, systems, and methods are disclosed herein to provide light splitting, light redirection, light homogenization, and light distribution in a single, ruggedized package in a cost-effective manner for a multitude of commercial and military applications. For example, embodiments of the present invention have particular application to the aircraft and automotive industries, where lower maintenance costs and lower initial purchase costs may lead to significant cost savings over the lifetime of various products. Further, the structures and methods disclosed have application to diverse technology areas including optical components, entertainment, mass communications, interior/exterior aircraft lighting, and aircraft runway lighting.

In accordance with an embodiment of the present invention, an apparatus includes a hollow tubular body with a polygonal cross-section and a highly reflective interior surface, a first filter, and a second filter. The body includes an input end portion configured to receive and reflect white light having a Gaussian profile to produce a homogenized input beam, a first output leg portion configured to receive and reflect a first reflected beam to produce a first homogenized output beam having a first wavelength characteristic and a top hat profile, and a second output leg portion configured to receive and reflect a second reflected beam to produce a second homogenized output beam having a second wavelength characteristic and a top hat profile. The first filter is configured to receive the homogenized input beam and produce the first reflected beam and a first transmitted beam. The second filter is configured to receive the first transmitted beam and produce the second reflected beam.

According to another embodiment, a light splitting and homogenizing apparatus includes a white light source for providing white light having a Gaussian profile, a hollow tubular body having a polygonal cross-section and a highly reflective interior surface, a first wavelength division multiplexing (WDM) filter, a second WDM filter, and a third WDM filter. The body includes an input end portion aligned along a first axis, a first output leg portion aligned along a second axis, a second output leg portion aligned along a third axis, and a third output leg portion aligned along a fourth axis. The first axis is perpendicular to each of the second axis, the third axis, and the fourth axis. The input end portion is configured to receive and reflect the white light within the input end portion to produce a homogenized input beam. The first WDM filter is configured to receive the homogenized input beam and produce a first reflected beam and a first transmitted beam. The first reflected beam is reflected within the first output leg to produce a first homogenized output beam having a first wavelength characteristic and a top hat profile. The second WDM filter is configured to receive the first transmitted beam and produce a second reflected beam and a second transmitted beam. The second reflected beam is reflected within the second output leg to produce a second homogenized output beam having a second wavelength characteristic different from the first wavelength characteristic. The third filter is configured to receive the second transmitted beam and produce a third reflected beam that is reflected within the third output leg to produce a third homogenized output beam that has a third wavelength characteristic and a top hat profile. The third wavelength characteristic is different from each of the first and second wavelength characteristics.

According to yet another embodiment of the present invention, a method of splitting and homogenizing white light includes the operations of applying a first beam of white light having a Gaussian intensity profile to an input end portion of a tubular body member having a polygonal cross-section and a highly reflective interior surface, reflecting the first beam within the input end portion to produce a homogenized input beam, applying the homogenized input beam to a first filter to produce a first reflected beam and a first transmitted beam, reflecting the first reflected beam within a first output leg of the body to produce a first homogenized output beam having a top hat intensity profile, applying the first transmitted beam to a second filter to produce a second reflected beam, and reflecting the second reflected beam within a second output leg to produce a second homogenized output beam having a top hat intensity profile. The first filter has a first reflective characteristic and a first transmissive characteristic, while the second filter has a second reflective characteristic. The first homogenized output beam has a wavelength determined by the first reflective characteristic, while the second homogenized output beam has a wavelength determined by the first transmissive characteristic and the second reflective characteristic.

According to another embodiment, a white light splitting and homogenizing apparatus comprises a hollow tubular body that has a polygonal cross-section and a highly reflective interior surface. The body including an input end portion, a first output leg portion, and a second output leg portion, where the input end portion is configured to receive white light that has a Gaussian profile and to reflect the white light within the input end portion to produce a homogenized input beam. The hollow tubular body is configured to receive a first filter disposed adjacent to the first leg where the first filter is configured to receive the homogenized input beam and to produce a first reflected beam and a first transmitted beam. The first reflected beam is reflected within the first output leg to produce a first homogenized output beam that has a first wavelength characteristic and a top hat profile. The hollow tubular body is configured to receive a second filter disposed adjacent to the second leg where the second filter is configured to receive the first transmitted beam and to produce a second reflected beam that is reflected within the second output leg. The reflection of the second reflected beam within the second leg produces a second homogenized output beam that has a second wavelength characteristic and a top hat profile.

One or more embodiments teach structures and methods that fulfill long felt needs in the industry by producing a combined light splitter and homogenizer for providing a plurality of homogenized output beams each having a top hat profile and a single color, where for example the incoming light beam comprises a broad-spectrum white light having a non-uniform, Gaussian intensity distribution. The disclosed structure may be beneficial because it does not include delicate components such as a glass rod, and thus may be manufactured more economically and used more reliably. Additionally, the disclosed structure may be rugged and used in applications that may receive physical shock. Because no additional optical components are needed, alignment issues may be eliminated.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
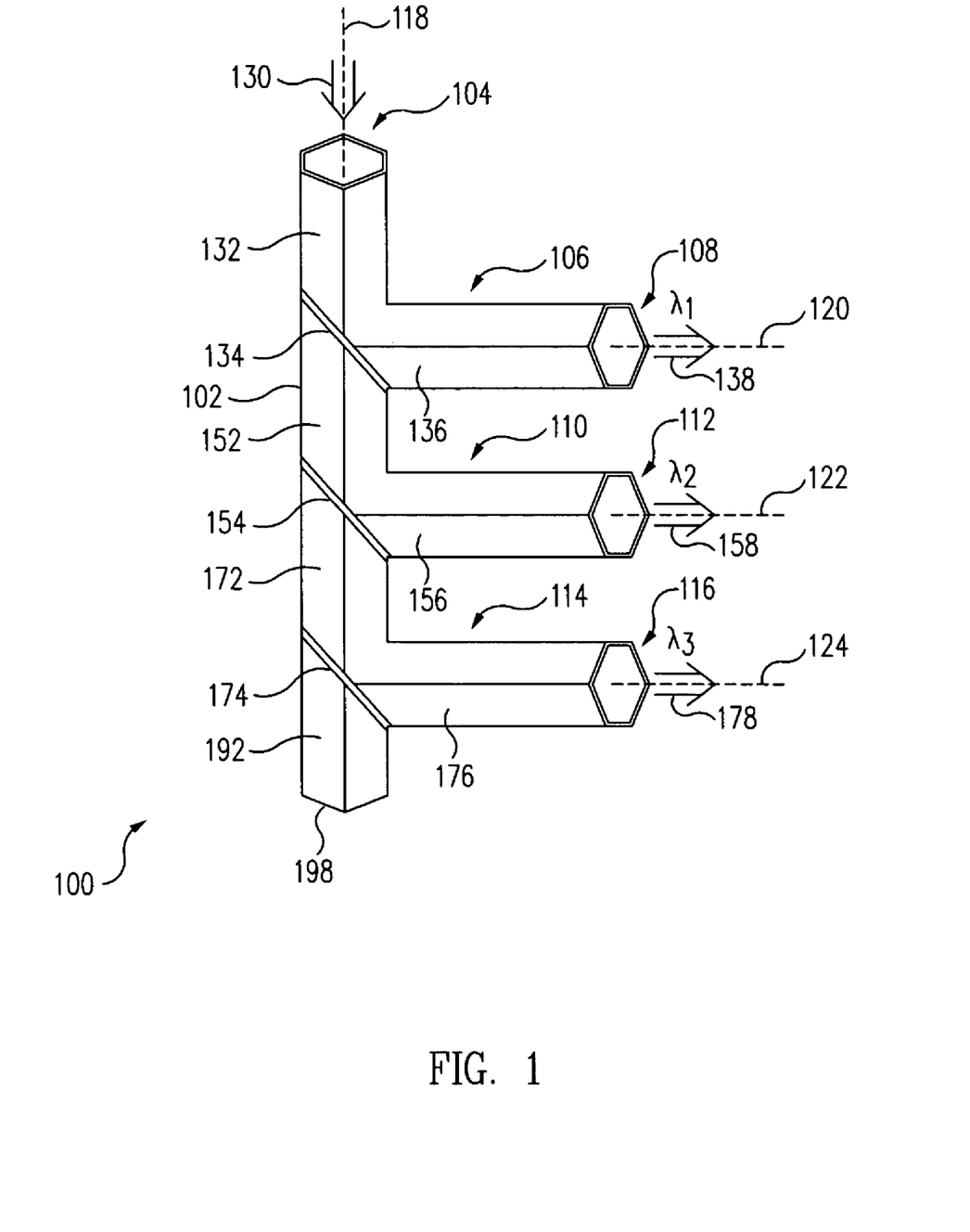
FIG. 1 shows a side view of a light splitting and homogenizing apparatus, in accordance with an embodiment of the present invention.

A strong requirement and market exists for a low-cost, rugged device that can operate efficiently as a white light splitter and homogenizer that requires no optical alignment. FIG. 1 shows a side view of a light splitting and homogenizing apparatus (LSHA) 100, in accordance with an embodiment of the present invention. Preferably, LSHA 100 includes a hollow tubular member or body 102 having interior regions with a polygonal cross-section and a highly reflective interior surface, where body 102 includes an input end portion 104 configured to receive Gaussian white light, a first leg 106 with a first output portion 108 configured to output homogenized light of a first color $\lambda_1$, a second leg 110 with a second output portion 112 configured to output homogenized light of a second color $\lambda_2$, and a third leg 114 with a third output portion 116 configured to output homogenized light of a third color $\lambda_3$.

LSHA 100 preferably includes three legs (106, 110, 114), but this is not considered limiting because HSHA may include a fewer or a greater number of legs without limitation. While a hexagonal cross-section for LSHA 100 is preferred, other geometrical cross-sections may also be used including square, pentagonal, heptagonal, and octagonal, for example. Further, input end portion 104 and each leg (106, 110, 114) may have the same or a different geometrical cross-sections. In this disclosure, the color of light refers to the wavelength or frequency distribution, band, or spectra of the light and may include both visible and invisible spectra.

Input end portion 104 is arranged about a central, longitudinal axis 118 so that a planar cross-section of input end portion 104 is hexagonal in shape. Input end portion 104 is configured to receive and reflect white light to produce a homogenized input beam. Longitudinal axis 118 can include a central line passing symmetrically through the long or axial direction of input end portion 104 and extending further into body 102 and equidistant from the highly reflective interior surfaces input end portion 104. First output portion 108 may be arranged about a central longitudinal axis 120 that is normal or perpendicular to the planar cross-section of input end portion 104, where first leg 106 and first output portion 108 may have a hexagonal cross-section. The longitudinal axis 118 and the longitudinal axis 120 may be arranged at right angles, or perpendicular, to each other. Similarly, second output portion 112 may be arranged about a central longitudinal axis 122 that is also normal to the planar cross-section of input end portion 104, where second leg 110 and second output portion 112 may have a hexagonal cross-section. The longitudinal axis 118 and the longitudinal axis 122 may be arranged at right angles, or perpendicular, to each other. Finally, third output portion 116 may be arranged about a central longitudinal axis 124 that is also normal to the planar cross-section of input end portion 104, where third leg 114 and third output portion 116 may have a hexagonal cross-section. The longitudinal axis 118 and the longitudinal axis 124 may be arranged at right angles, or perpendicular, to each other.

An input white light beam 130 entering input end portion 104 may be reflected off the highly reflective interior surfaces of body 102 within input end portion 104 comprising an interior reflection region 132 to produce an initial or partial homogenization of white light beam 130 within input end portion 104, denoted to as a homogenized input beam within input end portion 104. As used in this disclosure, homogenization includes a process of reflecting light off highly reflective interior surfaces of body 102 a minimum of five times in order to produce an output beam having a top hat profile. In one example, homogenization includes converting a smaller diameter light beam with a Gaussian intensity distribution into a larger diameter light beam with a top hat intensity distribution. The term Gaussian or the phrase Gaussian distribution refers to a normal or bell-shaped spatial intensity distribution characterized by a location of higher intensity near the center of a region or cross-section that falls off uniformly towards both sides of the region. In this case, the mode of the Gaussian curve corresponds to the center part of the white light beam. The phrase top hat (or top hat distribution) refers to a substantially equal spatial intensity distribution along the region or cross-section in a direction perpendicular to the output beam path. Additionally, the white light source may be composed of numerous wavelengths corresponding to specific colors.

Figure 2:
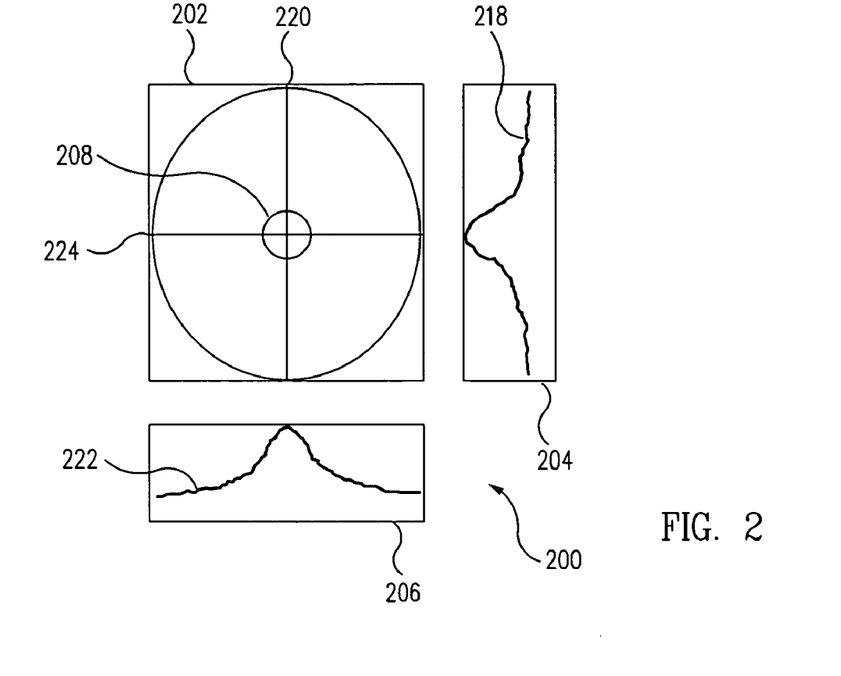
FIG. 2 shows a graphical intensity depiction including three plane views of an input Gaussian light beam, in accordance with an embodiment of the present invention.

FIG. 2 shows a graphical intensity depiction 200 including three plane views (202, 204, 206) of an input Gaussian light beam 208, in accordance with an embodiment of the present invention. Depiction 200 includes a frontal plane view 202 showing a two-dimensional intensity distribution of an exemplary cross-section of the input Gaussian light beam 208, a profile plane view 204 showing a Gaussian distribution curve 218 depicting the intensity across a central vertical diameter 220 or span, and a horizontal plane view 206 showing a Gaussian distribution curve 222 depicting the intensity across a central horizontal diameter 224 or span. In this manner, the light intensity profile varies across the diameter of the optical channel, in a direction perpendicular to the cross section of the channel, with a typical Gaussian intensity distribution.

Figure 3:
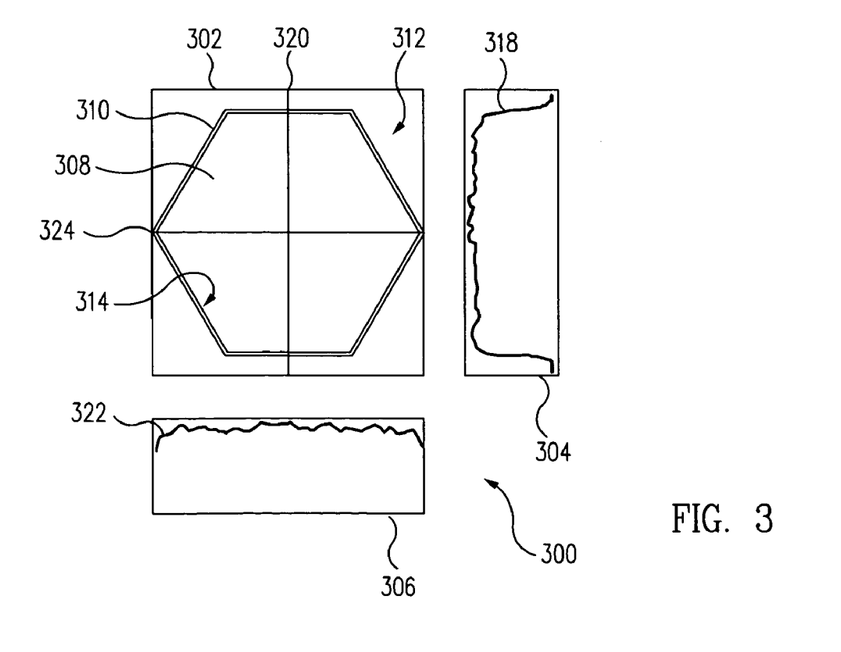
FIG. 3 shows a graphical intensity depiction including three plane views of an output top hat light beam from a tubular member having a hollow polygonal cross-section and a highly reflective interior surface, in accordance with an embodiment of the present invention.

FIG. 3 shows a graphical intensity depiction 300 including three plane views (302, 304, 306) of an output top hat light beam 308 from a tubular member 310 having a hollow polygonal cross-section 312 and a highly reflective interior surface 314, in accordance with an embodiment of the present invention. In this example, the polygonal cross-section of tubular member 310 may be a hexagon comprising six, equal-size planar side members, but this is not considered limiting. Specifically, depiction 300 includes a frontal plane view 302 showing an end view of a tubular member having a two-dimensional intensity distribution for an exemplary cross-section of the output top hat light beam 308, a profile plane view 304 showing a top hat distribution curve 318 depicting the intensity across a central vertical diameter 320 or span, and a horizontal plane view 306 showing a top hat distribution curve 322 depicting the intensity across a central horizontal diameter 324 or span of the polygonal cross-section. In this manner, the light intensity profile of output light beam 308 does not substantially vary across the diameter of the optical channel, in a direction perpendicular to the cross section of the channel, with a typical top hat intensity profile or distribution. The top hat intensity profile may be provided for all homogenized output light beams.

Figure 4:
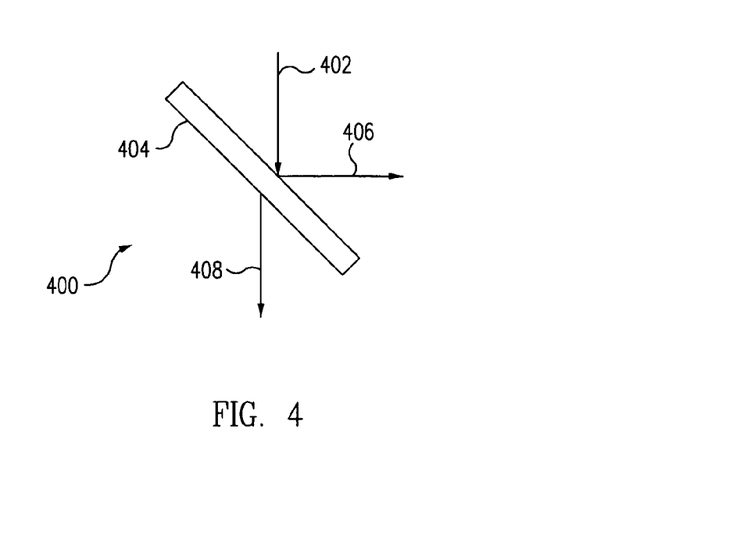
FIG. 4 shows a side view of an incident light beam being applied to a planar filter to produce a reflected beam and a transmitted beam, in accordance with an embodiment of the present invention.

FIG. 4 shows a side view of an incident light beam 402 being applied to a planar filter 404 to produce a reflected beam 406 and a transmitted beam 408, in accordance with an embodiment of the present invention. Some negligible portion of the incident energy upon filter 404 may be absorbed, converted, and/or attenuated in this process. In one example, filter 404 may be a planar filter member, such as a wavelength division multiplexing (WDM) filter, a pellicle beamsplitter, or a Bragg Plate (BP), having both reflective and transmissive characteristics. While an intermediately placed filter may have both reflective and transmissive characteristics, a terminal filter may have only a reflective characteristic. In one exemplary embodiment, filter 404 may be a pellicle beamsplitter supplied by CVI Laser, LLC, of Albuquerque, N. Mex., USA. In a preferred embodiment, a pellicle beamsplitter includes a very thin nitrocellulose membrane that is bonded to a lapped aluminum frame. The common problem of ghost images with a traditional beamsplitter is eliminated due to the extreme thinness of the membrane, since the second surface reflection is superimposed on the first surface reflection. In this manner, a pellicle beamsplitter provides minimal absorption, distortion, chromatic aberration, ghosting, and astigmatism due to the thinness of the membrane. A more detailed description of an exemplary filter 404 may include a substrate material comprising optical-grade nitrocellulose having a membrane thickness of 2.0-microns, a surface quality factor of 80-50 based on the military performance specification MIL-PRF-13830B, an index of refraction of n=1.5, being operable over a temperature range from between about −50° C. to about 100° C., and used at an angle of incidence of 45°.

Incident light beam 402 may comprise white light having many wavelength components and a Gaussian intensity profile, reflected beam 406 may include one specific wavelength from the incident light 402 based on the reflective characteristics of filter 404, and transmitted beam 408 may include the remaining wavelengths of the white light except for the one specific wavelength or wavelength band of reflected beam 406 based on the transmissive characteristics of filter 404. Reflected beam 406 may include a plurality of wavelengths in a wavelength range based on the reflective characteristics of filter 404. Alternatively, incident beam 402 may be a homogenized beam having a top hat profile where reflected beam 406 and transmitted beam 408 also have a top hat profile. In this case, reflected beam 406 may comprise light having one or more wavelengths based on the reflective characteristics of filter 404, while transmitted beam may comprise light having the remaining wavelengths based on the transmissive characteristics of filter 404.

Returning to FIG. 1, a plurality of tubular members, including input end portion 104, first leg 106, second leg 110, and third leg 114, are all specific embodiments of the tubular member 310 shown in FIG. 3. Light in region 132 may be applied to a first filter 134 to produce a first reflected beam and a first transmitted beam, where some negligible portion of the incident energy upon first filter 134 may be absorbed in this process. Filter 134 may be a particular embodiment of filter 404 shown in FIG. 4, and may be inserted at approximately a 45-degree angle of incidence at the intersection of the first end portion 104 along axis 118 and first leg portion 106 along axis 120, so that a normal to the surface of filter 134 bisects the angle between axis 118 and axis 120.

First filter 134 may be a first WDM filter that may be configured to reflect light in a first wavelength range or frequency band while passing or transmitting light outside of the first wavelength range, both higher and lower. The first wavelength range may include one or more light wavelengths. The first reflected beam may be redirected into an interior region 136 within first leg 106. The reflected light in region 136 may be further reflected off the highly reflective interior surfaces of body 102 in first leg 106 and thereby homogenized to emerge from first output portion 108 as a homogenized output beam 138 having a wavelength or frequency content determined by the reflective characteristics of first filter 134. In this manner, filter 134 may "pick off" light having specific wavelengths or colors from the original white light source. This selection of wavelengths may be determined by the user and performed by each specific filter. A hex bundle of fiber optic cables or other light conductors may be placed adjacent to first output portion 108 (near field) where each fiber optic cable receives a substantially equal (within 2%) intensity of light. Alternatively, the light from first output portion 108 may be emitted directly into the air or another medium. Light in region 132 emerges from first filter 134 as the first transmitted beam to enter an interior region 152 of body 102.

Light in region 152 may be applied to a second filter 154 to produce a second reflected beam and a second transmitted beam, where some negligible portion of the incident energy upon second filter 154 may be absorbed in this process. Second filter 154 may be a particular embodiment of filter 404 shown in FIG. 4, and may be inserted at approximately a 45-degree angle of incidence at the intersection of the first end portion 104 along axis 118 and second leg portion 110 along axis 122. Second filter 154 may be a second wavelength division multiplexing (WDM) filter that may be configured to reflect light in a second wavelength range or frequency band while passing light outside of the second wavelength range, both higher and lower. The second wavelength range may be different from or the same as the first wavelength range. The second reflected beam may be redirected into an interior region 156 within second leg 110, so that a normal to the surface of filter 154 bisects the angle between axis 118 and axis 122. The reflected light in region 156 may be further reflected off the highly reflective interior surfaces of body 102 in second leg 110 and thereby homogenized to emerge from second output portion 112 as a homogenized output beam 158 having a wavelength or frequency content determined by the transmissive characteristics of first filter 134 and the reflective characteristics of second filter 154. A portion of the light in region 152 emerges from filter 154 as the second transmitted beam to enter an interior region 172 of body 102. Alternatively, second filter 154 may be a glass plate or other partially reflective, non-filtering member so that the wavelength of light in region 152, region 156, and region 172, are the same. In this manner, homogenized light emitted from output 108 and output 112 may include the same wavelengths.

Light in region 172 may be applied to a third filter 174 to produce a second reflected beam and a second transmitted beam, where some negligible portion of the incident energy upon third filter 174 may be absorbed in this process. Third filter 174 may be a particular embodiment of filter 404 shown in FIG. 4, and may be inserted at approximately a 45-degree angle of incidence at the intersection of the first end portion 104 along axis 118 and third leg portion 114 along axis 124, so that a normal to the surface of filter 174 bisects the angle between axis 118 and axis 124. Third filter 174 may be a third wavelength division multiplexing (WDM) filter that may be configured to reflect light in a third wavelength range or frequency band while passing light outside of the third wavelength range, both higher and lower. The third wavelength range may be different from or the same as either or both of the first wavelength range and the second wavelength range.

The third reflected beam may be redirected into an interior region 176 within third leg 114. The reflected light in region 176 may be further reflected off the highly reflective interior surfaces of body 102 in third leg 114 and thereby homogenized to emerge from third output portion 116 as a homogenized output beam 178 having a wavelength or frequency content determined by the transmissive characteristics of first filter 134, the transmissive characteristics of second filter 154, and the reflective characteristics of third filter 174. A portion of the light in region 172 may emerge from filter 174 as the third transmitted beam to enter an interior region 192 of body 102 and may emerge from an output region 198 and be applied to a subsequent optical device or detector. Alternatively, third filter 174 may be a glass plate or other partially reflective, non-discriminating member so that the wavelength of light in region 172, region 176, and region 192, are the same. In this manner, homogenized light emitted from output 112 and output 116 may include the same wavelengths or other properties.

Each of the filters (134, 154, 174) inserted at the junction of the three legs (106, 110, 114) may have the same or different reflective and/or transmissive properties or characteristics to allow an optical system designer or end user to predetermine the wavelength or color of light that may be directed down each leg of body 102. While each of the three legs (106, 110, 114) are shown as aligned to output light in the parallel directions in substantially the same plane, other orientations are possible. For example, each of the three legs (106, 110, 114) may alternatively be arranged at 120-degree angles with respect to each other around longitudinal axis 118. In this disclosure, longitudinal axis 108 can include a central line passing symmetrically through the long or axial direction of tubular member body 102 equidistant from each side member and through interior regions on both sides of each filter.

Other insertion angles are possible for filters (134, 154, 174), where the angle of incidence is equal to the angle of reflection, so that a different angular relationship between input end portion 104 and one or more output legs (106, 110, 114) may be used. Preferably, if the angle between axis 118 and axis 120 is approximately 90-degrees, first filter 134 may be inserted at approximately 45-degree angle, half the magnitude of the angle between axis 118 and axis 120, so that a normal to the surface of filter 134 bisects the angle between axis 118 and axis 120. Changing the direction of the input light source by 90-degrees may be beneficial in circumstances where space is limited because a fiber-optic cable is typically delicate and may suffer breakage or loss. Alternatively, if the angle between axis 118 and axis 120 is approximately 120-degrees, first filter 134 may be inserted at approximately 60-degree angle. Any or all of the filters (134, 154, 174) may be placed at the same or different angles based on the desired angle of the output legs (106, 110, 114) and may be due to packaging constraints for a particular product design. Trade-offs between insertion angle, filter selection, and attenuation of the transmitted beam are a consideration in various alternative embodiments. For an embodiment having filters inserted at angles of approximately 45-degrees, analytical results have predicted an overall efficiency of greater than 93.5% while experimental results have measured efficiencies greater than 94.5% in a prototype system. While a widely available filter may be well suited for use at an angle of incidence near 45-degrees, custom filters may be required for use with other incidence angles.

Input light beam 130 may be a point source of white light having a wavelength range from about 380 nm to 780 nm covering the spectrum of visible light. Alternatively, input light beam 130 may include light above and/or below the visible spectrum. For this disclosure, white light may include a light beam that includes a plurality of wavelengths, and is thereby differentiated from single wavelength light beam having a particular color. The source of input light beam 130 may be any light conductor or light emitter including a light conducting tubular member placed adjacent to or partially within input end portion 104, an end portion of an optical cable such as a fiber-optic cable placed adjacent to or partially within input end portion 104, and/or a white light emitter such as an incandescent lamp, a fluorescent lamp, an Organic Light Emitting Diode (OLED), a chemical light source including a flame, the sun, and/or any other source of illumination placed adjacent to or partially within input end portion 104. The insertion distance partially within input end portion 104 may be up to about twice the diameter of input light beam 130 through an insertion plane that may be parallel to an outer edge of planar input end portion 104 away from filter 134.

More important than merely bending the input light beam 130 and redistributing the initial white light source into three separate new colored beams, one or more embodiments of the present invention provide for the conversion of an initial input Gaussian white light source applied to input end portion 104 into a highly homogenous, top hat profile beam at each of the three outputs (108, 112, 116). The separation of the input beam 130 into various wavelengths may be accomplished by the individual WDM filters (134, 154, 174) while homogenization may be accomplished by reflecting light off the highly reflective interior surfaces of input end portion 104 and/or output legs (106, 110, 114). The highly reflective interior surfaces of body 102 may cause a light beam to fold over onto itself numerous times while passing through body 102, thus reshaping the original input Gaussian profile beam into a highly-uniform, homogenous top hat profile beam.

Using properly selected WDM filters, white light having a Gaussian profile may be converted to homogenous red light having a top hat profile emitted from first output portion 108, homogenous green light having a top hat profile emitted from second output portion 112, and homogenous blue light having a top hat profile emitted from third output portion 116. In this manner, homogenous output light beams are generated for each of the primary colors: Red, Green, and Blue. Primary colors visible to a human subject in this case may comprise red light corresponds to a wavelength of about 630 nm to 760 nm, green light corresponds to a wavelength of about 490 nm to 570 nm, and blue light corresponds to a wavelength of about 420 nm to 490 nm. These different color, homogenous output beams may each be further applied to an optical conduit such as an optical fiber or other optical conducting channel, a display device utilizing the split and homogenized beam, and/or an optical sensor configured to detect some property from the homogenized output light beam.

Body 102 may be fabricated in an electroplating or electroforming process where a shaped form or mandrel corresponding to the interior regions of body 102 may be plated to build up a "stand alone" thickness where the highly reflective interior surface plating surrounding the mandrel is structurally self-supporting. The mandrel may then be removed by another process including melting, chemically etching, and/or exploiting some thermal property such as a difference between the coefficients of expansion between the mandrel and the plating in order to remove the mandrel and form body 102. In one embodiment, an aluminum form or mandrel may first be coated with silver, gold, or other highly reflective plating material, and then coated with nickel or other stronger material that may bond with and/or structurally support the highly reflective plating to provide structural rigidity for the body 102 having a highly reflective interior surface. The highly reflective layer may be very thin because the majority of structural support for body 102 is provided by an outer plating layer. In this exemplary embodiment, the highly reflective layer may only be a few atomic layers thick while the outer layer may be composed of nickel that may be approximately 0.002-inches thick. The thickness of the outer layer may be determined by the properties of the selected material and the rigidity requirements of a particular mission or application. By reducing the thickness of the highly reflective layer, the cost of the manufactured device may be kept low when the highly reflective material layer may be composed of silver, gold, or other precious metal. Generally, the composition of the highly reflective material depends upon the wavelength of light being reflected within the tubular member 102. In one preferred embodiment, the highly reflective material layer is composed of silver to reflect white light with maximum efficiency. Once the outer layer is formed, the aluminum form or mandrel may then be chemically melted away leaving the highly reflective interior surface within body 102.

Figure 5:
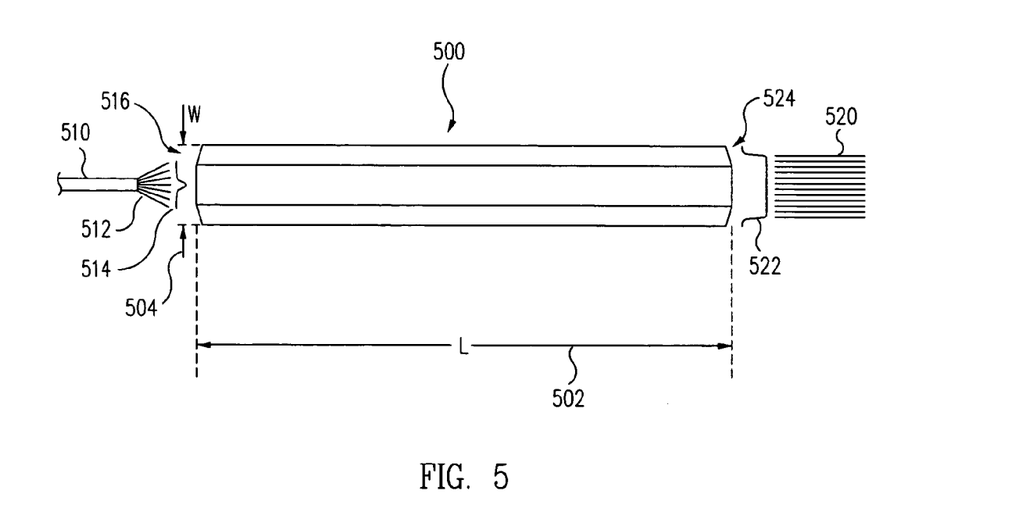
FIG. 5 shows a side view of an exemplary hollow tubular member portion of light splitting and homogenizing body, in accordance with an embodiment of the present invention.

FIG. 5 shows a side view of an exemplary hollow tubular member, or hex tube portion 500, of light splitting and homogenizing body 102, in accordance with an embodiment of the present invention. For maximum efficiency, and to achieve a top hat profile that may be uniform to within 98% of the optimum design, the hex tube portion 500 preferably has a length L 502 and a width W 504, where the W:L ratio may be approximately 1:6 for optimal homogenization at minimal cost. Stated differently, the measured intensity difference across the homogenized output beam may be uniform to within 2%. Each leg (106, 110, 114) of body 102 preferably has a length that is greater than or equal to six times the width (diameter) of the leg. In this case, L 502 is preferably six or more times larger than W 504. However, a range of W:L of about 1:5 to about 1:7 may also be acceptable since at least some homogenization occurs due to reflections within input end portion 104.

A light source 510 emits or conducts an input light beam 512 having a Gaussian intensity distribution 514 and applied to an input end 516 of portion 500. Light beam 512 may have a cone pattern where the light may be applied to a substantially central portion of input end 516, equidistant from each side of input end 516. Light beam 512 may then be applied to the highly reflective interior surface of the hex tube portion 500. As the applied light beam travels down the length L 502 it undergoes numerous reflections and emerges as an output beam 520 having a top hat profile 522 from an output end 524 of hex tube portion 500. During each of the reflections within an interior region of hex tube portion 500, the beam actually folds over onto itself resulting in the creation of a highly-uniform, homogenous top hat profile. After a minimum of five such reflections, the beam may be considered homogenous.

Referring again briefly to FIG. 1, body 102 may be provided to a user, designer, or technician who then selects one or more filters (134, 154, 174) and inserts the selected filters into the appropriate position within body 102 at the appropriate angle of incidence for each leg (106, 110, 114). In this manner, body 102 may be provided through one distribution or sales channel, while the one or more filters (134, 154, 174) may be specified, acquired, and inserted separately. Alternatively, a completed system 100 may be provided that includes one or more filters previously selected and installed.

Figure 6:
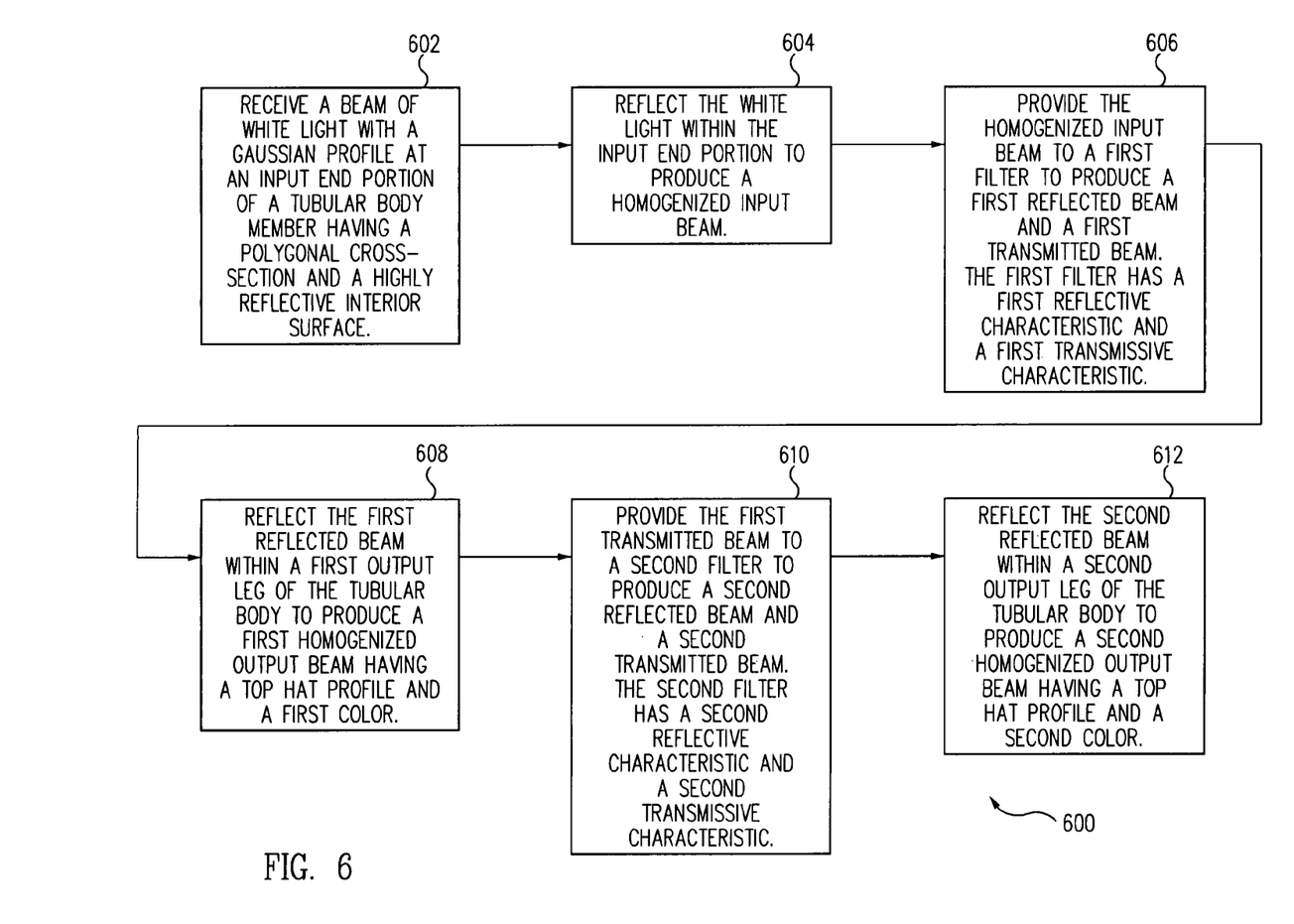
FIG. 6 shows operations in a white light splitting and homogenization flow, according to an embodiment of the present invention.

FIG. 6 shows operations in a white light splitting and homogenization flow 600, according to an embodiment of the present invention. In reference to FIGS. 1-6, flow 600 begins with receiving a first beam of white light 130 having a Gaussian intensity profile (218, 222) at an input end portion 104 of a tubular body 102 having a polygonal cross-section 312 and a highly reflective interior surface 314 in operation 602. In one example, white light may be emitted from a fiber optic cable 510 and applied to input end portion 104. Flow 600 continues with reflecting the white light beam within the input end portion 104 to produce a homogenized input beam in operation 604. In this manner, the Gaussian input light beam may be reshaped into a homogenous, top hat profile beam after repeated reflections from the sides of tubular body 102.

Flow 600 continues with providing the homogenized input beam to a first filter 134 to produce a first reflected beam and a first transmitted beam in operation 606. In this manner, the at least partially homogenized light in region 132 may strike filter 134 and a portion of the incident light in region 132 may be redirected at a 90-degree angle into region 136 within first leg 106. First filter 134 has a first reflective characteristic and a first transmissive characteristic. The first reflective characteristic determines the properties of the reflected light including the wavelength (color) or wavelength range of the reflected light. The first transmissive characteristic determines the properties of the transmitted light including the wavelength or wavelength range of the transmitted light. Flow 600 continues with reflecting the first reflected beam within a first output leg 106 of the tubular body 102 to produce a first homogenized output beam 138 having a top hat intensity profile. The first homogenized output beam 138 has a wavelength characteristic determined by the first reflective characteristic in operation 608. When the first filter 134 reflects a specific wavelength, the first homogenized output beam 138 has a predetermined first color or wavelength $\lambda_1$. Flow 600 continues with providing the first transmitted beam to a second filter 154 to produce a second reflected beam, where the second filter has a second reflective characteristic, in operation 610. In this manner, the homogenized light in region 152 may strike filter 154 and a portion of the incident light in region 152 may be redirected at a 90-degree angle into region 156 within second leg 110.

Flow 600 concludes with reflecting the second reflected beam within second output leg 110 of the tubular body 102 to produce a second homogenized output beam 158 having a top hat intensity profile in operation 612. The second homogenized output beam 158 has a wavelength determined by the first transmissive characteristic and the second reflective characteristic. When the second filter 154 reflects a specific wavelength, the second homogenized output beam has a predetermined second color or wavelength $\lambda_2$ that may be different from the first color. Although an exemplary embodiment of flow 600 shows a Gaussian white light source that may be split and homogenized to produce two homogenized output beams readirected at a 90-degree angle, this process may be utilized for one, three, or more homogenized output beams at the same or different angles, where the transmitted beam from a prior stage may be reflected by a subsequent filter having reflective and/or transmissive characteristics. In this manner, any number of homogenized color output beams may be produced from a single Gaussian white light beam. For example, in an optional continuation of flow 600 for a third filter 174, wherein the second filter 154 has a second transmissive characteristic and applying the first transmitted beam to the second filter produces a second transmitted beam, this continuation of flow 600 may include applying the second transmitted beam to a third filter 174 to produce a third reflected beam, and reflecting the third reflected beam within a third output leg 114 to produce a third homogenized output beam 178 having a top hat intensity profile. The third homogenized output beam 178 has a wavelength characteristic determined by the first transmissive characteristic, the second transmissive characteristic, and the third reflective characteristic. This process may be continued for as many steps as desired, but practically until the losses and design limits of a particular application are exceeded.

Embodiments described above illustrate but do not limit the invention. It should also be understood that numerous modifications and variations are possible in accordance with the principles of the present invention. Accordingly, the scope of the invention is defined only by the following claims.

I claim:

1. A white light splitting and homogenizing apparatus, comprising:
    a hollow tubular body having a polygonal cross-section and a highly reflective interior surface, the body including an input end portion, a first output leg portion, and a second output leg portion, the input end portion being configured to receive white light having a Gaussian profile and to reflect the white light within the input end portion to produce a homogenized input beam;
    a first filter configured to receive the homogenized input beam and to produce a first reflected beam and a first transmitted beam, the first reflected beam being reflected within the first output leg to produce a first homogenized output beam having a first wavelength characteristic and a top hat profile; and
    a second filter configured to receive the first transmitted beam and to produce a second reflected beam that is reflected within the second output leg to produce a second homogenized output beam having a second wavelength characteristic and a top hat profile.

2. The apparatus of claim 1, wherein the input end portion is aligned along a first axis and the first output leg portion is aligned along a second axis, the first axis being different from the second axis, and the first filter being disposed at the intersection of the first axis and the second axis.

3. The apparatus of claim 2, wherein the first axis and the second axis are perpendicular to each other.

4. The apparatus of claim 3, wherein the second output leg portion is aligned along a third axis, the first axis being different from the third axis, and the second filter being disposed at the intersection of the first axis and the third axis, and wherein the first axis and the third axis are perpendicular to each other.

5. The apparatus of claim 1, wherein the first filter has a first reflective characteristic that determines the wavelength characteristic of the first homogenized output beam.

6. The apparatus of claim 5,
    wherein the first filter has a first transmissive characteristic, and
    wherein the second filter has a second reflective characteristic, the first transmissive characteristic and the second reflective characteristic determining the wavelength characteristic of the second homogenized output beam.

7. The apparatus of claim 6, wherein the first filter is at least one of a wavelength division multiplexing (WDM) filter and a pellicle beamsplitter, each being configured to reflect a first predetermined wavelength of light as the first reflected beam and pass a plurality of wavelengths of light other than the first predetermined wavelength of light as the first transmitted beam.

8. The apparatus of claim 1, wherein light is reflected a minimum of five times within the body to produce at least one of the first homogenized output beam and the second homogenized output beam having a top hat profile.

9. The apparatus of claim 1, wherein the body highly reflective interior surface includes a metal plating, the metal in the metal plating being selected from the group consisting of silver and gold.

10. The apparatus of claim 1, further comprising an exterior metal plating configured to provide structural rigidity for the body.

11. The apparatus of claim 10, wherein the exterior metal plating includes nickel.

12. The apparatus of claim 1,
    wherein the body further includes a third output leg portion and the second filter produces a second transmitted beam, the apparatus further comprising:
    a third filter configured to receive the second transmitted beam and produce a third reflected beam, the third reflected beam being reflected within the third output leg to produce a third homogenized output beam having a third wavelength characteristic and a top hat profile.

13. The apparatus of claim 12, wherein the second filter is at least one of a wavelength division multiplexing (WDM) filter and a pellicle beamsplitter, each being configured to reflect a second predetermined wavelength of light as the second reflected beam and pass a plurality of wavelengths of light other than the second predetermined wavelength of light as the second transmitted beam, the second predetermined wavelength being different from the first predetermined wavelength.

14. The apparatus of claim 12, wherein the third filter is a wavelength division multiplexing (WDM) filter configured to reflect a third predetermined wavelength of light as the third reflected beam, the third predetermined wavelength of light being different from the first predetermined wavelength and the second predetermined wavelength.

15. A light splitting and homogenizing apparatus, comprising:
   means for receiving white light having a Gaussian profile;
   means for homogenizing the white light to produce a homogenized input beam;
   means for receiving the homogenized input beam and generating a first reflected beam and a first transmitted beam, the first reflected beam having a first wavelength characteristic;
   means for homogenizing the first reflected beam to produce a first homogenized output beam having a top hat profile;
   means for receiving the first transmitted beam and generating a second reflected beam having a second wavelength characteristic; and
   means for homogenizing the second reflected beam to produce a second homogenized output beam having a top hat profile.

16. The apparatus of claim 15, wherein the homogenizing means includes a body with a highly reflective interior surface including a metal plating, the metal in the metal plating being selected from the group consisting of silver and gold.

17. The apparatus of claim 15, wherein the body further includes an exterior metal plating configured to provide structural rigidity for the body.

18. The apparatus of claim 17, wherein the exterior metal plating includes nickel.

19. A method of splitting and homogenizing white light, the method comprising:
   receiving a first beam of white light having a Gaussian profile at an input end portion of a tubular body having a polygonal cross-section and a highly reflective interior surface;
   reflecting the first beam within the input end portion to produce a homogenized input beam;
   providing the homogenized input beam to a first filter to produce a first reflected beam and a first transmitted beam, the first filter having a first reflective characteristic and a first transmissive characteristic;
   reflecting the first reflected beam within a first output leg of the tubular body to produce a first homogenized output beam having a top hat profile, the first homogenized output beam having a wavelength characteristic determined by the first reflective characteristic;
   providing the first transmitted beam to a second filter to produce a second reflected beam, the second filter having a second reflective characteristic; and
   reflecting the second reflected beam within a second output leg of the tubular body to produce a second homogenized output beam having a top hat profile, the second homogenized output beam having a wavelength characteristic determined by the first transmissive characteristic and the second reflective characteristic.

20. The method of claim 19, wherein the second filter has a second transmissive characteristic and applying the first transmitted beam to the second filter produces a second transmitted beam, the method further comprising:
   applying the second transmitted beam to a third filter to produce a third reflected beam, the third filter having a third reflective characteristic; and
   reflecting the second reflected beam within a third output leg of the body to produce a third homogenized output beam having a top hat profile, the third homogenized output beam having a wavelength characteristic determined by the first transmissive characteristic, the second transmissive characteristic, and the third reflective characteristic.

21. The method of claim 19, wherein the polygonal cross-section is a hexagon.

22. A white light splitting and homogenizing apparatus, comprising:
   a hollow tubular body having a polygonal cross-section and a highly reflective interior surface, the body including an input end portion, a first output leg portion, and a second output leg portion, the input end portion being configured to receive white light having a Gaussian profile and to reflect the white light within the input end portion to produce a homogenized input beam,
   wherein the hollow tubular body is configured to receive a first filter disposed adjacent to the first leg, the first filter being configured to receive the homogenized input beam and to produce a first reflected beam and a first transmitted beam, the first reflected beam being reflected within the first output leg to produce a first homogenized output beam having a first wavelength characteristic and a top hat profile, and
   wherein the hollow tubular body is further configured to receive a second filter disposed adjacent to the second leg, the second filter being configured to receive the first transmitted beam and to produce a second reflected beam that is reflected within the second output leg to produce a second homogenized output beam having a second wavelength characteristic and a top hat profile.

23. The apparatus of claim 22, further comprising at least one of the first filter and the second filter.

24. The apparatus of claim 23, wherein the at least one of the first filter and the second filter is at least one of a wavelength division multiplexing (WDM) filter and a pellicle beamsplitter.

* * * * *